United States Patent [19]

Somorjai et al.

[11] Patent Number: 4,460,443
[45] Date of Patent: Jul. 17, 1984

[54] ELECTROLYTIC PHOTODISSOCIATION OF CHEMICAL COMPOUNDS BY IRON OXIDE ELECTRODES

[75] Inventors: Gabor A. Somorjai; Christofer H. Leygraf, both of Berkeley, Calif.

[73] Assignee: The Regents of the University of California, Berkeley, Calif.

[21] Appl. No.: 416,351

[22] Filed: Sep. 9, 1982

[51] Int. Cl.$^3$ ............................................. C25B 1/04
[52] U.S. Cl. ................................................. 204/129
[58] Field of Search ........................................ 204/129

[56] References Cited

U.S. PATENT DOCUMENTS 4,259,418  3/1981  Clark et al. .......................... 204/129
4,263,111  4/1981  Hooper et al. ....................... 204/129

OTHER PUBLICATIONS

Hardee & Bard—J. Electrochem. Soc. 124, 215, (1977).
Yoneyama et al.—Electrochim. Acta 20, 341, (1975).
A. Nozik, Appl. Phys. Letter 30, 567, (1977).
Otashi et al., Nature 266, 610, (1977).
Mettee et al., Solar Energy Water 4, 443, (1981).
Wagner et al., J. Am. Chem. Soc. 102, 5474, (1980).
Kennedy et al., J. Electrochem. Soc. 127, 2307, (1980).

*Primary Examiner*—R. L. Andrews
*Attorney, Agent, or Firm*—Phillips, Moore, Lempio & Finley

[57] ABSTRACT

Chemical compounds can be dissociated by contacting the same with a p/n type semi-conductor diode having visible light as its sole source of energy. The diode consists of low cost, readily available materials, specifically polycrystalline iron oxide doped with silicon in the case of the n-type semi-conductor electrode, and polycrystalline iron oxide doped with magnesium in the case of the p-type electrode. So long as the light source has an energy greater than 2.2 electron volts, no added energy source is needed to achieve dissociation.

9 Claims, No Drawings

ELECTROLYTIC PHOTODISSOCIATION OF CHEMICAL COMPOUNDS BY IRON OXIDE ELECTRODES

The Government has rights in this invention pursuant to Contract No. DE-AC03-76SF00098 awarded by the U.S. Department of Energy.

BACKGROUND OF THE INVENTION

The present invention relates to the photodissociation of chemical compounds by electrolytic means, and more particularly to such molecular dissociation reactions in an electrolytic cell wherein the electrodes are doped iron oxide.

During the past several decades there has been considerable interest and intense research in photochemical dissociation of chemical molecules, especially water. These studies have generally centered around chlorophyl mediated reactions which involve complex multi-step reactions to achieve the photodissociation of water and the synthesis of various organic compounds. As a general outgrowth of research in this area, some studies have been undertaken into simpler photochemical systems which are capable, or potentially capable, of catalytically mediating the dissociation of chemical compounds into their respective elements. In this regard, one area of interest has been the photocatalytic dissociation water into its respective elements, oxygen and hydrogen by means of electrolytic processes. In such processes, currents are induced in semi-conductor materials by photon irradiation, and these currents, often with the assistance of externally applied potentials, have achieved low rate of dissociation of water. Fugishima et al reported in Nature 238, 37, 1972, that they achieved association, but only with the aid of an externally applied potential. F. T. Wagner et al. reported (J. Am. Chem. Soc. 102, 5444) in 1980 the photo dissociation of water utilizing strontium titanate single crystals or polycrystalline powders thereof. A. J. Nozik in 1976 (App. Phys. Letters 29, 150), and K. Ohashi et al., in 1977 (Nature 266, 610) reported that when n-type $SrTiO_3$ or $TiO_2$, and p-type GaP or CdTe were used in an electrolytic cell as anode and cathode, respectively, and irradiated with ultraviolet energy, water was dissociated without using any externally applied electrical potentials.

H. Mettee et al. in 1981 (Solar Energy Mat. 4, 443) have reported that a p/n diode, consisting of single crystal p-type GaP and polycrystalline n-type $Fe_2O_3$, splits water at relatively low quantum yields when such diode was irradiated with visible and near ultra-violet light.

Such techniques, however, either require the addition of an externally applied potential to accomplish the dissociation; or they require radiation in the ultra-violet region; or they require electrodes fabricated from scarce rare elements, or carefully and expensively produced single crystals.

Therefore it is of considerable interest to devise processes for the photodissociation of water, or for the photo induced hydrogenation of CO, or $CO_2$ to produce hydrocarbons, etc., wherein the photo process relies upon visible light, does not require any externally applied electrical potentials, utilizes common, readily available electrode materials, and utilizes simple, and inexpensive fabrication techniques for the electrodes.

BRIEF DESCRIPTION OF THE INVENTION

The present invention provides a process for photoelectrolytic dissocation utilizing radiation in the visible solar range; wherein the electrolytic cell electrodes are fabricated from common, easily obtained, and inexpensive compounds; wherein the electrodes are fabricated in a simple, straightforward and inexpensive process; and wherein the photodissociation is accomplished solely by photo induced electrical potentials and without the aid of any externally applied electrical potentials.

More specifically, the dissociation of water is accomplished by the use of photoactive ferric oxide semi-conductor materials as electrodes in an electrolytic cell. The ferric oxide semi-conductor materials are prepared as a diode wherein one electrode, the cathode, is a p-type $Fe_2O_3$ semi-conductor; and the other electrode, the anode, is an n-type $Fe_2O_3$ semi-conductor. The cathode and anode are connected to one another by an insulated electrical connection, and the circuit is completed by immersing the electrodes in water as the electrolyte. In order to increase the conductance of the water, and to adjust the pH to from about 6 to 14 where the photo activity is greater, an ionizing component is added.

The cell is provided with a window to admit light to the electrodes. The admitted light may comprise solar radiation or an artificial source. The radiation must have an energy level at least equal to the band gap of $\alpha$-$Fe_2O_3$, i.e., 2.2 eV, and preferably somewhat greater than that figure, e.g., energies between 2.2 and 2.9 eV, i.e., in the visible range.

The electrode materials are based on polycrystalline $Fe_2O_3$. The $Fe_2O_3$ is doped to convert it into either an n-type semiconductor, or a p-type semiconductor. The n-type iron oxide is produced by doping with $SiO_2$. The p-type iron oxide is produced by doping with MgO. All of the electrode components are readily available and they are inexpensive.

When a cell such as that described above is illuminated with visible light, a photocurrent is induced resulting in the dissociation of water as evidenced by the production of gaseous hydrogen on the cathode surface. So long as the illumination is maintained, dissociation of the water continues. However, after about 6–8 hours of exposure, $H_2$ production rate drops and the photocurrent declines. The $H_2$ production and photocurrent can be restored to their initial levels by flowing oxygen or air through the electrolyte for several (1–20) minutes.

Thus a useable photocurrent can be induced, and water can be dissociated, by shining visible light on an electrolytic cell having doped iron oxide electrodes and water as the electrolyte.

It is therefore an obect of the invention to provide an electrolytic cell for the dissociation of chemical compounds wherein the only source of energy is light.

It is another object of the invention to provide an electrolytic cell for the dissociation of chemical compounds wherein the dissociation is driven by visible light and the cell electrodes are fabricated from polycrystalline ferric oxide.

It is another object of the invention to provide electrodes for a photoelectrolytic cell wherein both the anode and cathode are fabricated from doped iron oxide.

It is yet another object of the invention to provide a process for the dissociation of chemical compounds utilizing a photoelectrolytic cell driven solely by visible light and wherein the chemical compounds are dissociated between doped ferric oxide electrodes.

It is another object of the invention to provide a p-type $Fe_2O_3$ electrode useful in a photoelectrolytic cell.

Other objects and advantages of the invention will become apparent from the following specification, and the claims appended hereto.

DETAILED DESCRIPTION OF THE INVENTION

In the present invention chemical compounds, and, in particular water, are dissociated in an electrolytic cell wherein the chemical compound comprises, or partly comprises, the cell electrolyte. This electrolyte is in contact with an anode and a cathode especially devised to develop an electrical potential when irradiated with visible light. Of course the anode and cathode have an insulated electrical connection between them, and the electrolyte completes the electrical circuit. Such cell is capable of dissociating the chemical compounds without the aid of any externally applied electrical potential. That is, the cell, under conditions as hereinafter described develops sufficient electrical potential to cause dissociation of the chemical compound and the evolution of its constituent elements at the anode and cathode.

The electrodes are the key elements in the electrolytic cell and they comprise a p-type ferric oxide polycrystalline semi-conductor material as the cathode; and an n-type ferric oxide polycrystalline semi-conductor material as the anode. When maintained in electrical contact, the cathode and anode comprise a p/n semi-conductor diode.

The p-type ferric oxide cathode is a highly pure $Fe_2O_3$ polycrystalline sintered compact that has been doped with a small percentage of MgO. For purposes of the invention the Mg may comprise from about 1 to about 20 atom percent Mg of the cathode material. It is preferred that the Mg comprise between about 5 and about 10 atom % of the cathode material, since the highest photocurrents are generated when these %'s are present.

The n-type ferric oxide anode is a highly pure $Fe_2O_3$ polycrystalline sintered compact that has been doped with a small percentage of $SiO_2$. The Si may comprise from about 1 to about 5 atom % Si in the doped material. At much below 1 atom % Si, the $Fe_2O_3$ conductivity greatly decreases and the onset potential for photocurrent production becomes unacceptably high. Si dopings above 10 atom % produce no apparent improvement in either the conductivity or in the onset potentials.

It should be noted also, that the doped $Fe_2O_3$ electrodes function in the invention process when in the polycrystalline form. Thus they can be produced in a relatively simple and inexpensive process (as will be discussed hereinafter) from pure iron oxide powders.

The doped ion oxide electrodes may be produced in any desired shape, but usually in the form of disks or thin films, so that the surface area to volume is high. Thus a greater surface will be available for contact with the electrolyte at the least cost for material.

To form a p/n diode, provision must be made to maintain the anode and cathode in electrical contact. The electrodes may be connected by means well known in the art. For instance an electrically conducting wire of Ag or Ni, etc., may be affixed at each of its ends to the respective electrode. An electrically conducting epoxy compound, such as Ag-epoxy, works quite well. In an alternate form, the anode and cathode may be bonded directly to one another, as by means of the silver-epoxy compound. The particular means of electrically connecting the anode to the cathode is not important so long as a low resistance electrical connection is maintained. The connection as well as the affixing means, e.g., silver-epoxy compound, should be insulated from the electrolyte. Therefore, these components are covered with a tightly adherent electrical insulation material, such as silicone rubber.

To optimize photocurrent production, it is advantageous to ensure high oxidation of the electrode surfaces. Therefore, it is desirable to subject the electrodes to oxidizing conditions before cell operation begins. This can be done by imposing an externally generated electrical potential on the electrodes for a short period of time to ensure oxidation of the iron component, or oxygen can be bubbled through the cell for the same purpose.

To complete the electrolytic cell, the doped $Fe_2O_3$ diode is immersed in an electrolyte. The electrolyte includes the compound which is to be electrolysed. If water is to be dissociated, the electrolyte is, of course, water. However small amounts of a polar material are added to increase the electrolyte conductivity and maintain the pH between about 6 and 14. Where water is being dissociated, $Na_2SO_4$ or NaOH may be added to maintain the pH in the desired range. Of course, other polar compounds could be used to increase the electrolyte conductivity, so long as they are not corrosive to the electrodes, and do not interfere with the electrochemical reactions that take place on the electrode surfaces.

The electrolytic cell need not be in any special configuration. It should be constructed of an inert material, e.g., glass, ceramic, plastic coated metals, etc. If the gases evolved from the electrodes are to be collected, the cell should be closed and provision for purging, or circulating the air space over the electrolyte must be made. However, all such structures form no part of this invention, and are well known in the art. Provision must be made, however, for shining light on the diode. Therefore, a window is provided, suitably made from quartz, to permit light into the cell interior.

As noted above, the illuminating light is in the visible range, having an energy of at least 2.2 eV, and up to about 2.2 eV or greater. The light intensity must be sufficient to initiate the desired photocurrent. In test cells, an incoming light intensity of about 35 mW on a 1 $cm^2$ surface area was quite sufficient to generate $H_2$ evolution at the cathode surface.

Other features of the invention, and some results obtained in experimental work, will be apparent from a review of the following.

Preparation of the Electrodes

The electrodes of the invention are prepared from powders of the components in a pressing and sintering procedure.

Fine powders having particle sizes averaging perhaps 1 to 10$\mu$ are utilized. The powders should be of high purity, 99.9% or better. All the powdered components, $Fe_2O_3$, $SiO_2$, and MgO are available in the required purity from a number of commercial sources. For instance, the $Fe_2O_3$ can be obtained from MCB Mfg. Chemists of Norwood, Oh. The $SiO_2$ and MgO powders can be obtained from Mallinkrodt Chemicals of Paris, Ky.

In any event, the powdered components are first mixed to thoroughly and completely distribute the dopant into the $Fe_2O_3$. As noted, if it is desired to prepare an n-type electrode, the desired amount of $SiO_2$ is mixed with the $Fe_2O_3$. If a p-type electrode is to be produced, the desired amount of MgO is mixed with the $Fe_2O_3$.

Once thoroughly mixed, the powders are compressed to form tightly adherent pellets, or disks. Pressures in the order of about 7000 kg/cm² are sufficient to produce tightly compacted pellets or disks.

The compacted pellets, or disks are then placed in a furnace under air atmosphere, and sintered. In order to produce electrodes with the desired properties, sintering temperatures within the range of 1340° to about 1480° C., are necessary. The compacted pellets or disks, are held at the noted temperatures for a number of hours, preferably in the neighborhood of 15–20 hours in order to fully sinter the powdered components.

After the desired sintering time has elapsed, the electrodes are rapidly cooled to room temperature, by removing them from the sintering furnace and immediately placing them on metal sheets in the open air. The metal sheets, e.g., aluminum or stainless steel, act as heat sinks to rapidly draw the heat from the electrode compacts. At the same time air is permitted to freely circulate over the electrode surfaces to add to the rapid cooling.

Alternately, the p-type electrode, i.e., $Fe_2O_3$+MgO can be quickly quenched in water to produce electrodes with the desired resistivity and response to light energy. The n-type electrodes, however, should not be water quenched, since such quenching reduces their ability to generate a current on light illumination.

In any event, after reaching room temperature, the electrodes are ready for use in an electrolytic cell, or they may be stored indefinitely for use at a later time.

Other electrode configurations can be utilized. For instance, a thin film of the doped iron oxide can be affixed to a backing material to make a composite electrode in which the doped iron oxide comprises only the exposed surface area. Other electrode configurations will be apparent to those skilled in the art. Such improved configurations may contribute to increased power efficiency of such cells.

Electrode material prepared according to the above procedures has been studied to elucidate the surface morphology and phase characteristics. X-ray analysis, scanning electron microscopy, and Auger electron spectroscopy, showed the $SiO_2$-doped material to be heterogenous with two phases. One phase was the $Fe_2O_3$ matrix doped with Si. The second phase was $Fe_{23}$ highly enriched with Si. The MgO-doped samples consisted principally of an Mg-doped $Fe_2O_3$ matrix.

The resistivity of such electrode material was in the range of $10^3$–$10^4$ ohms.cm, where the Si dopant ranged from 1–20 atom %. Where the material was doped with Mg, in a range of from 1–10 atom %, the resistivity ranged from $10^3$–$10^5$ ohms.cm.

EXAMPLE 1

Photoelectrochemical and photochemical experiments were conducted in an apparatus consisting of an electrochemical cell for measurements of current-potential curves and a closed circulation loop for transporting $H_2$ gas produced from the cell to a gas chromatograph where the amount of hydrogen produced was detected. For standard photoelectrochemical studies the cell consisted of a working electrode, a Pt counter electrode and a Mercuric Oxide Luggin capillary reference electrode. The cell was further fitted with a quartz window for illuminating the electrodes and with provisions for inert gas inlet and outlet. Current-voltage curves obtained in the dark and under illuminations were obtained using a Pine RDE 3 potentiostat enabling the sample to be studied either under potentiostatic or potentiodynamic conditions. All dark and photocurrent figures were obtained under potentiostatic steady state conditions.

Illumination of the cell was provided by a 500 W Tungsten halogen lamp focused with quartz optics and with most of the infra-red radiation absorbed by a 5 cm water cell. A visible pass filter (Corning 3-72) allowed photons with $h\nu \leq 2.7$ eV to illuminate the electrodes. The irradiance was measured with a thermopile detector. The incomimg power at the electrodes was 35 mW on a 1 cm² surface area.

A gas chromatograph (Hewlett Packard 5720 A) fitted with a thermal conductivity detector and a molecular sieve 5A column was used to detect $H_2$ produced in the cell. Calibration of the gas chromatograph was carried out by injecting small but well defined doses of $H_2$ and $O_2$ directly into the cell. The detection limit corresponded to a production rate in the cell of $10^{16}$ $H_2$ molecules/hour. The detection limit for $O_2$ was 15 times higher. Direct measurements of photoinduced $O_2$ production was difficult, however, because of high leak rates (of the order of $10^{17} O_2$ molecules/min) into the cell and loop system. The closed loop contained argon gas to carry $H_2$ from the cell through a sampling valve to the gas chromatograph. The gas was circulated by means of a mechanical pump. Blank experiments involving only the electrolyte and a sample holder in the cell gave no indication of $H_2$ produced, either in the dark or under illumination.

To connect the sample to the potentiostat a Ni wire was attached to one side of each sample with Ag epoxy. Silicon rubber sealant was used to insulate the wire and the epoxy from the electrolyte solution. In other experiments p- and n-type iron oxide electrodes were connected by means of a Ni wire and a microammeter, thereby enabling measurement of the photoinduced current between the electrodes in addition to measuring the amount of hydrogen evolved from the p-type iron oxide cathode. These experiments were carried out in the same cell as before but without using the potentiostat.

The n-type and p-type iron oxide electrodes were studied separately and then as the p/n diode assembly. The onset potential for the production of photocurrent was an important parameter considered. If a photoinduced current is to occur between an n-type and a p-type sample without any applied potential, a necessary condition is that the onset potential of the n-type electrode be less (more cathodic) than that of the p-type electrode. An onset potential for phtocurrent production can be defined as the lowest potential where a photocurrent of 0.5 $\mu$A/cm² is observed.

Table I (middle column) below sets forth the onset potential of Si-doped iron oxides in 0.01 N or 1 N NaOH as a function of the atom fraction of Si.

TABLE 1

Onset Potential (mV, RHE) for Photocurrent Production of Iron Oxide With Different Atomic Fractions of Si

| Si/Si + Fe (atom %) | Onset Potential in 1 N NaOH or 0.01 N NaOH (mV, RHE) | Onset Potential After Oxidation Treatment ($O_2$ purging at 60/80° C.) in 1 N NaOH (mV, RHE) |
|---|---|---|
| 0 | 725 ± 25 | 650 ± 50 |
| 1 | 600 ± 25 | 500 ± 50 |
| 2 | 600 ± 25 | 450 ± 50 |
| 3 | 625 ± 25 | 475 ± 50 |
| 5 | 600 ± 25 | 450 ± 50 |
| 10 | 650 ± 25 | 575 ± 50 |
| 20 | 650 ± 25 | 600 ± 50 |
| 50 | 700 ± 25 | |

As shown in the Table, the onset potential dropped from 0.725±0.025 V to 0.600±0.025 V (RHE) upon introduction of 1 atom % Si and remained at that value with increasing Si concentration. Above 20 atom % Si the onset potential rose again. These results hold true in both 0.01 N NaOH and 1 N NaOH, with a tendency for the onset potential to be slightly less in the 1 N NaOH solution.

The onset potential for photocurrent production could be further lowered by oxidizing the n-type iron oxide surface. This was accomplished either by anodic polarization of the sample at potentials above 900 mV (RHE) or by purging the solution with oxygen at temperatures in the range of 60° to 80° C. With both oxidizing treatments a decline in onset potential was observed in the range of 100–200 mV for most of the Si-doped iron oxides studied. Thus, the combination of Si-doping and oxidation of the iron oxide samples decreased the onset potential by 100 mV to 300 mV as compared to undoped n-type iron oxide.

Table 2 below sets forth the onset potentials for photocurrents production of p-type Mg doped ion oxides in 0.01 N NaOH and 0.1 M $Na_2SO_4$. The solutions in which the Mg-doped iron oxides were tested included 0.1 M $Na_2SO_4$, 0.01 N, 1 N and 3 N NaOH, 0.5 M NaCl and distilled water. The photocurrents in the NaOH solutions increased with decreasing pH (as opposed to the behavior of n-type samples which exhibit decreased photocurrent with dilution) but were poor in distilled water.

During prolonged polarization no poisoning of the photoactivity was observed. While polarizing a Mg-doped sample (Mg/Mg+Fe=5 atom %) at 600 mV (RHE) the photocurrent in the 0.01 N NaOH solution increased over an 8 hour period by 50% and in the 0.1 M $Na_2SO_4$ solution by 30% in the same time span.

TABLE 2

Onset Potential (mV, RHE) for Photocurrent Production of Iron Oxide With Different Atomic Fractions of Mg

| Mg/Mg + Fe (atom %) | Onset Potential in 0.01 N NaOH (mV, RHE) | Onset Potential in 0.1 M $Na_2SO_4$ (mV, RHE) |
|---|---|---|
| 1 | 1000 ± 50 | 850 ± 50 |
| 5 | 950 ± 50 | 825 ± 50 |
| 10 | 950 ± 50 | 850 ± 50 |
| 20 | 725 ± 50 | 650 ± 50 |

As will be noted in Table 2, in both solutions the three lower Mg dopant levels give similar onset potentials, while the 20 percent Mg doped sample exhibited 200–300 mV lower onset potentials. In the NaOH or in the $Na_2SO_4$ solutions poisoning of the p-type iron oxides occurred after 6–8 hours of exposure when connected with an n-type iron oxide. Oxygen introduced after a sample had been poisoned succeeded in reoxidizing the cathode and regenerating a photocurrent comparable to the original photocurrent before poisoning.

As set forth in Tables 1 and 2 above, the onset potential for photocurrent production of n-type Si-doped iron oxides was less (more cathodic) than that of the best p-type Mg-doped iron oxides. When connecting n-type and p-type iron oxides by a conducting wire over a microammeter, a certain photocurrent would be expected to flow between the n-type and p-type iron oxides.

In a number of experiments, p/n iron oxide diode assemblies were made with n-type iron oxide anodes that contained Si/Si+Fe=2 atom %; while the p-type iron oxide cathodes had Mg dopant levels varied between 1 and 20 atom %. The photoactivity of the p/n assembly in different aqueous solutions was measured either by monitoring the photocurrents, or detecting $H_2$ in the gas chromatograph. Table 3 below gives measured photocurrents of p/n iron oxide assemblies with different Mg contents. The results are based on 1 hour of exposure in 0.01 N NaOH and in the absence of an external potential. Values of photocurrents were measured when both samples were illuminated, or when either the n-type or the p-type iron oxide was illuminated alone. Illuminating both samples gave photocurrents which in general were higher than the sum of the photocurrents produced when only illuminating either the n-type or the p-type sample. Variation in photocurrents during one hour were typically within ±5%. As seen in Table 3, a dark current was observed which was below 0.5 μA and which decreased with time to less than 0.1 after 10–20 hours of exposure.

TABLE 3

Measured Photocurrents in p/n Iron Oxide Assemblies After One Hour of Exposure in 0.01 N NaOH
n-type: Si/Si + Fe = atom %
p-type: Mg/Mg + Fe = 1, 5, 10 and 20 atom %

| Mg/Mg + Fe (atom %) | 1 | 5 | 10 | 20 |
|---|---|---|---|---|
| Photocurrent (μA) | | | | |
| both n- and p-type illuminated | 5 | 8 | 13 | 3 |
| only n-type illuminated | 2.5 | 2.5 | 3.5 | 2.5 |
| only p-type illuminated | 1.5 | 1.5 | 4 | 0.5 |
| no illumination | <0.5 | <0.5 | <0.5 | <0.5 |

The photoactivity of the p/n diode assemblies was also measured by detecting the $H_2$ evolution from the p-type cathode. When photoinduced $H_2$ production rates were measured in addition to photocurrent, an agreement within ±25% was found as shown in Table 4 below.

TABLE 4

Measured Photocurrents and $H_2$ Production Rates in p/n Iron Oxide Assembly After One Hour of Exposure in 0.01 N NaOH and 0.1 M $Na_2SO_4$
n-type: Si/Si + Fe = 2 atom %
p-type: Mg/Mg + Fe = 5 atom %

| | 0.01 N NaOH | 0.1 M $Na_2SO_4$ |
|---|---|---|
| Both samples illuminated Photocurrent (μA) | 8 ± 1 | 6 ± 1 |
| $H_2$ production rate ($10^{16}$ molecules/hour) | 6 ± 0.5 | 5 ± 0.5 |

Steady state rates of $H_2$ evolution in the range of one monolayer (=$10^{15}$ $H_2$ molecules) per minute could be sustained for hours in both 0.01 N NaOH and 0.1 M $Na_2SO_4$ in the absence of any external potential.

After about 6-8 hours of exposure in both NaOH and $Na_2SO_4$ electrolytes the $H_2$ production rate and the photocurrent in the p/n iron oxide diode declined. Subsequent separate photoelectrochemical measurements showed that the photoactivity of the p-type iron oxide had declined in proportion, while the photoactivity of the n-type sample remained unchanged. The partly deactivated assembly could be readily regenerated by flowing oxygen through the solution at room temperature for 1-20 minutes. Using this treatment, both the $H_2$ production and the photocurent returned to their original higher values.

We claim:

1. A process for the photocatalytic dissociation of chemical compounds comprising ionizing said chemical compounds in aqueous solution into respective cations and anions, contacting the aqueous solution with a first electrode comprised of an n-type iron oxide semi-conductor material, and with a second electrode comprised of a p-type iron oxide semi-conductor material, providing an electrical connection between said first and second electrodes and insulated from said aqueous solution, shining light energy in the visible region onto both said electrodes to induce an electrical potential therebetween and through said aqueous solution, and neutralizing and liberating the cations at the p-type iron oxide electrode and the anions at the n-type iron oxide electrode.

2. The process of claim 1 wherein the visible light has an energy of at least 2.2 electron volts.

3. The process of claim 1 wherein the n-type iron oxide material is doped with silicon.

4. The process of claim 3 wherein the silicon is present in from about 1 to 10 atom %.

5. The process of claim 1 wherein the p-type iron oxide material is doped with magnesium.

6. The process of claim 5 wherein the magnesium is present in from about 1 to 20 atom %.

7. The method of claim 5 wherein the aqueous solution is maintained at a pH of from about 6 to 14.

8. The process of claim 1 wherein the ionized chemical compound is water.

9. A method for dissociating water into its elements utilizing visible light as the sole energy source comprising providing a p/n type semi-conductor diode where said diode consists of a p-type iron oxide semi-conductor electrode doped with magnesium in electrical contact with an n-type iron oxide semi-conductor electrode doped with silicon, contacting said diode with water maintained at a pH of from about 6 to 14, exposing said diode to visible light having an energy of at least 2.2 electron volts to generate an electrical potential between said electrodes to thereby dissociate the water and evolve hydrogen at the p-type electrode and oxygen at the n-type electrode.

* * * * *

UNITED STATES PATENT AND TRADEMARK OFFICE
CERTIFICATE OF CORRECTION

PATENT NO. : 4,460,443
DATED : July 17, 1984
INVENTOR(S) : Gabor A. Somorjai, Christofer H. Leygraf It is certified that error appears in the above-identified patent and that said Letters Patent is hereby corrected as shown below:

Column 2, line 54, after "an" and before "of",
  it should read --object--.

Column 5, lines 52, and 53, after "the" and before "matrix",
  it should read --$Fe_2O_3$--.

Column 5, line 53, after "was" and before "highly",
  it should read --$Fe_2O_3$--.

Column 6, line 63, after "for" and before "production",
  it should read --photocurrent--.

Signed and Sealed this

Twenty-third Day of October 1984

[SEAL]

Attest:

GERALD J. MOSSINGHOFF

Attesting Officer          Commissioner of Patents and Trademarks